United States Patent [19]

Lerner et al.

[11] Patent Number: 4,726,536
[45] Date of Patent: Feb. 23, 1988

[54] POWER CORD AND WIRE SHORTENER

[75] Inventors: Larwence Lerner, Beverly Hills; Stephen P. Diskin, Los Angeles, both of Calif.

[73] Assignee: Mega/Erg Inc., Beverly Hills, Calif.

[21] Appl. No.: 922,533

[22] Filed: Oct. 23, 1986

[51] Int. Cl.⁴ .............................................. B65H 75/38
[52] U.S. Cl. ................................ 242/100.1; 191/12.4; 439/528
[58] Field of Search ................... 339/119 C; 191/12.2, 191/12.9; 292/85.1, 100.1, 107.1, 107.13, 86.1, 100; 439/527-528

[56] References Cited

U.S. PATENT DOCUMENTS 2,865,071 12/1958 Clemens ..................... 242/85.1 X
4,150,798 4/1979 Aragon ........................ 191/12.2 X

FOREIGN PATENT DOCUMENTS 1426975 3/1976 United Kingdom ............. 242/107.1

Primary Examiner—Eugene F. Desmond
Attorney, Agent, or Firm—Charles H. Schwartz; Ellsworth R. Roston

[57] ABSTRACT

A power cord and wire shortener in the form of a short cylindrical reel which allows shortening and organizing power cords and wires to an exact, desired length and which can be used with small appliances and the like especially in office workstations and household or industrial worksurfaces.

3 Claims, 6 Drawing Figures

POWER CORD AND WIRE SHORTENER

BACKGROUND

The present invention is intended to address the proliferation of power cords and wiring in and around office workstations, household or industrial worksurfaces where small appliances, telephones or data processing equipment are used. The problem derives from two factors: first, many more powered or connected devices are now in common use; and, second, these devices are in the vast majority provided with power cords or wiring of fixed length. While some electrical appliances have built in reels or similar provisions for storing unneeded cord, most have no such amenity; and excess cord, when it occurs, must be specially routed, stored, or simply ignored. In some instances, this extra wiring is a safety hazard; in all cases it is a nuisance. The present invention, in its design and construction, and by virtue of being attachable to a variety of wire gauges, at any point in the length of a cord, serves efficiently to shorten and contain wiring that otherwise drapes or intrudes into unwanted areas. Routing and organizing numerous wires and cables is also simplified when the lengths of these cords can effectively be customized.

SUMMARY

The power cord and wire shortener is meant to provide adjustment to exact length and storage of excess of a range of wire gauges, in particular, the power cords or connecting wiring of typical small appliances, such as radios, typewriters, telephones and the like. As such, the device would find frequent applications on household or industrial worksurfaces, or in offices where electrical appliances and data processing equipment is in widespread use.

The present invention consists of a short cylinder reel made in two halves which rotate about a common axis. Wire to be shortened is first formed into a loop at any desired location and then inserted into a slot in the device. The two halves of the cylinder are then counter-rotated with respect to one another, and the inserted wire is thereby wound into a coil within the device. A closure clip snaps into place to close the wire insertion slot. The device may then rest on any horizontal surface, or be mounted to a vertical surface or the underside of a horizontal surface by means of pressure sensitive adhesive applied to the underside, or by suitable mounting hardware.

The primary object of the invention is to provide a power cord and wire shortener capable of reducing any of a variety of power cords or wire connectors to a desired length and storing the excess quickly and easily when wire is inserted into the device and the upper and lower halves of the device are counter-rotated to produce an automatic tightly-wound, internal coil.

Further advantages will be noted from the following description and with reference to the drawings.

DETAILED DESCRIPTION

Figure 1:
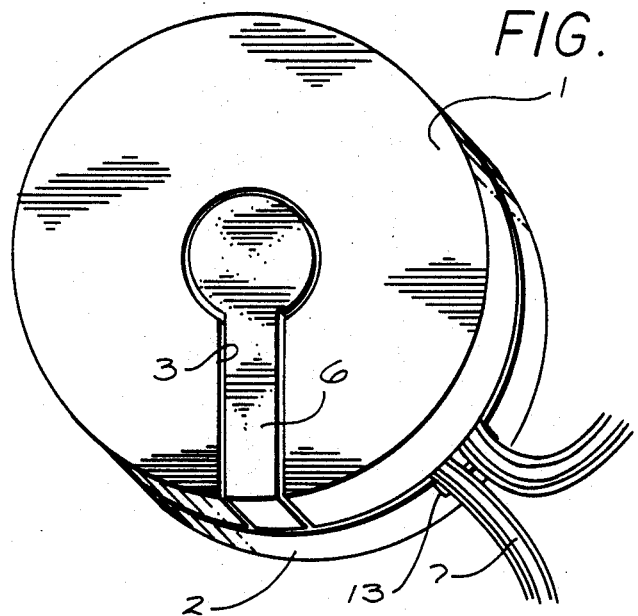
FIG. 1 is a perspective view of the present invention.
Figure 2:
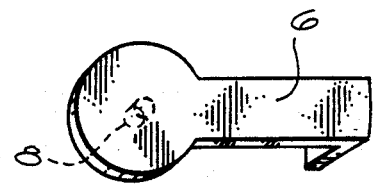
FIG. 2 is a perspective view of the closure clip which constitutes a portion of the invention.

Referring now to the invention in more detail, it can be seen in FIG. 1 that the present device consists of upper (1) and lower (2) cylindrical portions of identical diameters and located coaxially with respect to one another. Further, the upper portion has formed into it a through-slot (3) configured to accept a closure clip (6) which, when in place, fills the exact size and shape of the slot. To use the device, the closure clip is removed by unsnapping it from its normal position, thus giving access to the interior of the device. Wire (7) is formed into a loop at whatever point desired and inserted into the device via the slot (3) and ultimately allowed to exit through an aperture (13) in the bottom half of the device. The clip is replaced and the wire may be conveniently wound to any appropriate length. As seen in FIG. 2, the closure clip (6) is shaped to fit the slot in the device and, in the present embodiment of the invention, is furnished with a short post (8) which permits the closure clip to be snapped into and retained in the device. However, other methods of retaining this clip, including typical snap and friction fit to the upper half of the device, without a protruding post (8) are entirely possible.

Figure 3:
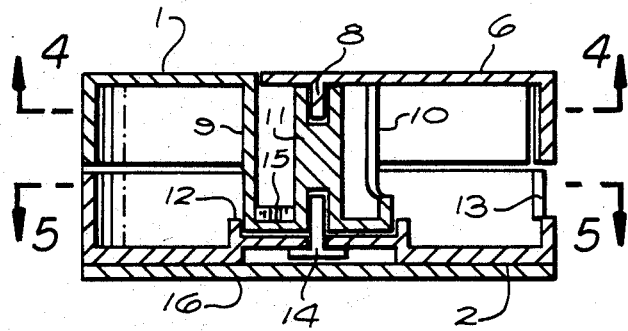
FIG. 3 shows a vertical cross section through the device taken along the axis of the closure clip.
Figure 4:
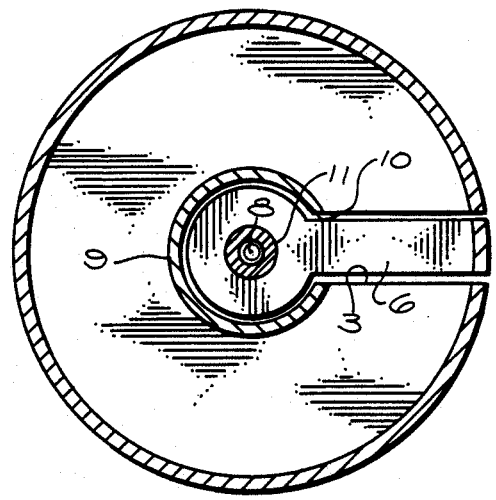
FIG. 4 indicates a horizontal cross section looking toward the underside of the upper half of the device and showing the closure clip in place.
Figure 5:
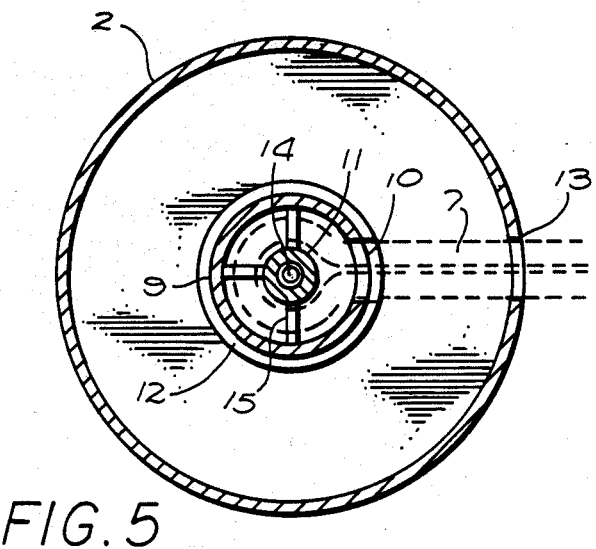
FIG. 5 is a horizontal cross section looking downward at the inside surface of the lower half of the device.

The device's internal configuration is best understood in FIG. 3, while cross-referencing FIGS. 4 and 5. Integral with the upper cylinder (1) is the winding cylinder (9) whose inner surface is exposed to view when the closure clip (6) is removed. Within the winding cylinder (9) are several features to be noted: a slot (10) through which a loop of wire introduced into the device must pass such that the wire loop is grasped firmly when the device is in use, a center shaft (11) for attachment of components, and small structural ribs (15) for stiffening.

The lower cylinder portion of the present invention (2) is also shown clearly in FIG. 3. Note a central raised cylindrical element (12) which mates with the winding cylinder (9). When two halves of the device are joined and retained by a pin (14), screw, or similar typical connector. Finally, the edge of the lower cylindrical half of the device is notched to form an aperture through which wire exits to the exterior and through which wire is pulled as it is wound into the interior of the device. A pressure sensitive adhesive material (16) may be applied to the lower (2) cylindrical portion for mounting the device to a horizontal or vertical surface.

FIG. 4 shows the underside of the upper cylinder half with the closure clip in place. Especially to be pointed out is the slot (10) in the winding cylinder (9) which extends entirely to the underside of the closure clip (6). Also shown in cross section is a center shaft (11) element with a hole in its top, sized to accept the short post (8) of the closure clip (6).

Figure 6:
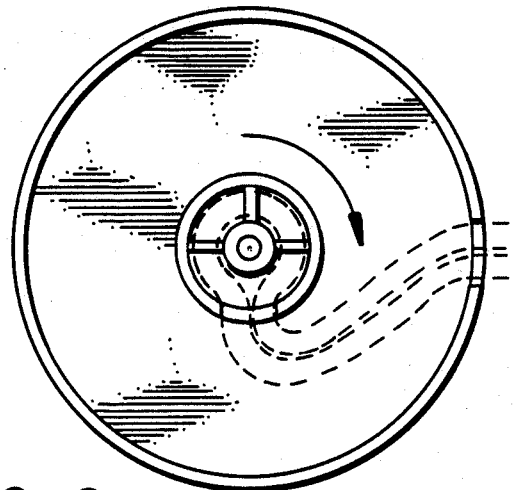
FIG. 6 is a diagrammatic representation resembling FIG. 5 and showing the method in which wire is formed into a coil within the device when the upper and lower halves of the invention are counter-rotated.

FIGS. 5 and 6 illustrate the device in use, looking downward in crosssection. A loop of power cord, or wire (7) is formed and inserted into the device from above through the slot (3). The loop is fitted into the center of the winding cylinder (9) and around the center shaft (11) such that the two ends of the loop exit parallel to one another through a slot (10) in the winding cylinder (9) then through an aperture (13) in the lower cylinder half (2). FIG. 5 also shows the location of three structural ribs (15).

To wind cord or wire into the cavity, the closure clip in the upper half of the device is snapped into place and the two halves of the device are grasped firmly in hand and counter-rotated. This causes the winding cylinder (9) to move relative to the lower half of the device. In FIG. 6, a rotation of ninety degrees has formed the beginning of a tight coil of wire as it is pulled into the cavity. Internal friction of the two parallel portions of wire against the interior surfaces of the device, the aperture in the case (13), and the wire against itself, is sufficient to prevent unwinding. Thus, any desired amount of winding and the resultant shortening and storage of excess cord or wire can easily be achieved.

I claim:

1. In a power cord and wire shortener, a pair of opposed hollow cylindrical elements of substantially similar dimension, joined coaxially to form a cylindrical internal cavity into which power cord or wire may be inserted, a winding cylinder coaxially located within the cylindrical internal cavity and extending from one of the pair of cylindrical elements and having a diameter substantially smaller than the diameter of the pair of hollow cylindrical elements, an upstanding shaft member located coaxially within the winding cylinder and extending toward an end surface of the one of the pair of cylindrical elements, a single slot located along the length of the winding cylinder and with the other of the opposed hollow cylindrical elements including a circumferential slot extending out of the internal cavity, the end surface of the one of the pair of cylindrical elements including a slot extending from the upstanding shaft toward the side of the one of the pair of cylindrical elements, the power cord or wire shortened by looping the cord or wire around the upstanding shaft and leading the doubled cord or wire through the single and circumferential slots to rest in the circumferential slot in the other of the pair of cylindrical elements, and which, when the two cylindrical elements of the device are counter-rotated, produces an internal coiling of said inserted power cord or wire within the internal cavity and thus a resultant shortening by any desired amount and storing the excess length of said power cord or wire.

2. A power cord and wire shortener as stated in claim 1 in which additional adhesive mounting means permit attachment to any surface in any location and in either horizontal or vertical orientation.

3. A power cord and wire shortener as stated in claim 1 additionally including a closure clip to cover the end surface slot.

* * * * *